United States Patent [19]

Asada

[11] Patent Number: 5,018,008
[45] Date of Patent: May 21, 1991

[54] METHOD OF AND APPARTUS FOR SETTING COLOR SEPARATION

[75] Inventor: Shinji Asada, Kyoto, Japan

[73] Assignee: Dainippon Screen Mfg. Co. Ltd., Japan

[21] Appl. No.: 389,293

[22] Filed: Aug. 3, 1989

[30] Foreign Application Priority Data

Aug. 11, 1988 [JP] Japan ............................ 63-201646

[51] Int. Cl.$^5$ ............................................ H04N 1/46
[52] U.S. Cl. ........................................ 358/78; 358/80
[58] Field of Search ............................ 358/75, 78, 80

[56] References Cited

U.S. PATENT DOCUMENTS 4,618,883 10/1986 Sakamoto ............................ 358/80
4,901,258 2/1990 Akiyama ............................ 358/80

OTHER PUBLICATIONS

Tadakazu Okuno et al., "Multivariate Analysis Method"—2nd Edition, pp. 261-267, published Apr. 10, 1981.

Primary Examiner—Howard W. Britton
Assistant Examiner—Kim Yen Vu
Attorney, Agent, or Firm—Ostrolenk, Faber, Gerb & Soffen

[57] ABSTRACT

A color original image is pre-scanned in order to detect respective color components of sample pixels. Then, it is decided whether each sample pixel has color components corresponding to a designated "memory color" within a predetermined allowable error range. A "memory color" represents colors with respect to which persons have preconceived notions, i.e., memories, as to their correct tone, hue, etc., for example, the color of the sky, trees, or the like. When the number of sample pixels having the memory color is larger than a threshold value, a predetermined color separation rule is corrected to obtain a corrected color separation rule which is used for separating the color original image into components suited for reproduction of an image corresponding thereto.

18 Claims, 8 Drawing Sheets

METHOD OF AND APPARTUS FOR SETTING COLOR SEPARATION

BACKGROUND OF THE INVENTION

1. Field of the Invention

The present invention relates to a method of and an apparatus for setting color separation rules for use in separating colors of a color image in a color image processor such as a color process scanner.

2. Description of the Prior Art

As well known in the art, a color process is operable to read a color original by reading each pixel thereof in the order of scanning lines, and color image data thus obtained is subjected to color separation processing, to obtain image data for reproducing a color image.

Such color separation is performed in accordance with various color separation rules. An important one out of the rules concerns memory colors included in the color original. The "memory colors" are such colors that humans often observe in their daily life through visual experience and remember the impression thereof.

For example, if the percentage of areas of the memory colors such as a skin color of a human being, a green color of trees and plants, and a blue color of the sky and the sea in the color original is relatively large, the memory colors must be reproduced on a print in a color tone corresponding to the impression on humans in order to render a good-quality print. Therefore, the color separation rule for memory colors must be different from standard rules.

Furthermore, in some cases gradation curves may be shifted relative to normal curves prepared with reference to gray tones. For example, when a skin color of a human being is in the color original, the intermediate density part of a gradation curve is corrected such that the density of ink on a magenta (M) block is slightly higher than those of an yellow (Y) block and a cyan (C) block. Consequently, a gray portion of the original is reproduced at a slightly reddish tone while a skin-colored portion thereof is a reproduced in a color more similar to the color of the skin remembered by humans, resulting in a desirable print.

Such correction processing of memory colors has been conventionally performed manually.

However, since most of color originals whose colors are separated by a color scanner include such memory colors, the above-indicated correction for the memory colors is frequently required. Therefore, there is a problem of significantly increasing the burden on the operator.

Additionally, considerable experience for manual operation of a color scanner is required in such setting of the color separation rules for the memory colors. Thus, there are problems of the difficulty in standardizing the manual work and in variations in quality of prints depending on the subjectivity of the operator.

In order to deal with these problems, it is desired to automate setting of the color separation rule with respect to memory colors. However, as techniques for automatically setting the color separation rule in the color scanner, only a technique for automatically setting the color separation rule with respect to a gray tone has been known. Techniques suitable for automatically setting the color separation rule such as a gradation correction rule and a color correction rule has not been actually developed.

SUMMARY OF THE INVENTION

The present invention is directed to a method of setting color separation rule in a color image processor, the color separation rule being used to separate a color image data into color components suitable for reproducing a color image represented by the color image data.

According to the present invention, the method comprises the steps of: (a) designating a memory color, (b) determining a criterion for judging whether or not a given color represented by a set of color components coincides with the memory color under a predetermined allowable error, (c) designating sample pixels among pixels of a color original image prepared for image reproduction, (d) detecting respective color components for each sample pixel, (e) applying the criterion to the color components for each sample pixel to detect the number of sample pixels whose respective colors coincide with the memory color under the allowable error, (f) finding a ratio of the number to a total number of the sample pixels, and (g) determining a first color separation rule in accordance with the ratio to set the first color separation rule in a color image processor which is used for separating the original image into color components in order to reproduce the color original image for each color component.

Preferably, the step (b) includes the step of:

(b-1) defining a closed region in a color coordinate space so that a point representing the memory color in the color coordinate space is located in the closed region.

The criterion may be such that the given color is regarded as the memory color if a point representing the given color in the color coordinate space is located in the closed region.

In the preferred embodiment, the step (b) further includes the steps of: (b-2) detecting respective color components of a plurality of sample images for each pixel, each of the plurality of sample images having the memory color, and (b-3) statistically analyzing the color components of the plurality of sample images to find parameter values representing a color distribution around the memory color in the plurality of sample images.

In this case, the step (b-1) includes the step of: (b-11) determining a shape and a size of the closed region in accordance with the parameter values.

The present invention is also directed to an apparatus for attaining above-indicated method.

Figure 1:
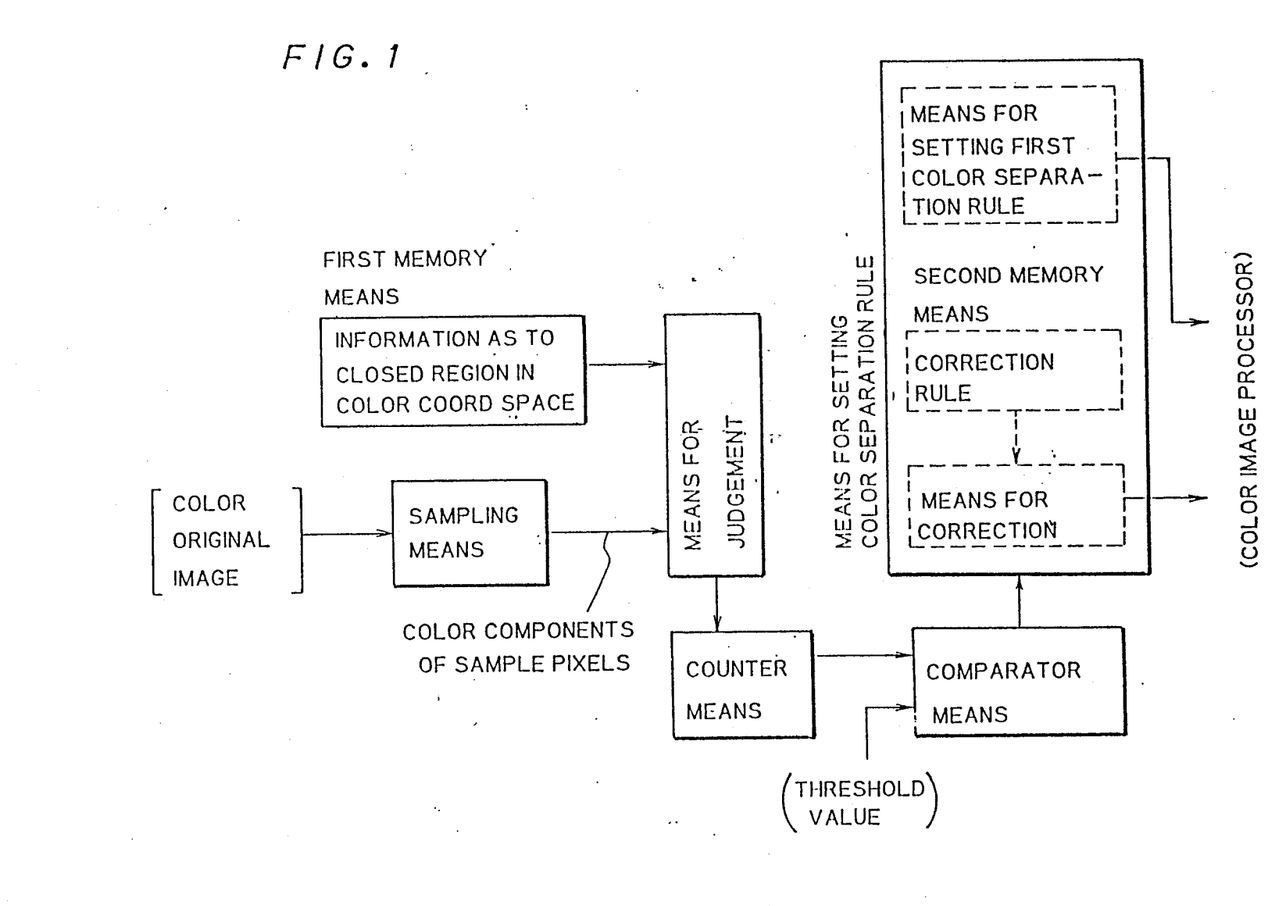
FIG. 1 is a diagram showing the concept of the present invention.

As schematically shown in FIG. 1, the apparatus according to the present invention comprises: (a) first memory means for storing information representing a closed region which is defined in a color coordinate space such that a center point of the closed region is located at a point representing a designated memory color in the color coordinate space and a size of the closed region is determined in accordance with an allowable error in detection of the memory color, which allowable error is obtained by statistically analyzing a plurality of sample images having the memory color, (b) sampling means for extracting sample pixels from a color original image to detect respective color components for each sample pixel, (c) means for judging whether or not a point having coordinate values represented by the color components of each sample pixel is located in the closed region in the color coordinate space, (d) counter means for counting the number of sample pixels whose colors are located in the closed region to generate a count value proportional to the number, (e) comparator means for comparing the count value with a predetermined threshold value, and (f) means for selectively setting one of first and second color separation rule in the color image processor in accordance with a result of comparison in the comparator means, where the first and second color separation rules are different from each other.

In accordance with one aspect of the present invention, as shown in FIG. 1 with dotted blocks, the means (f) includes: (f-1) second memory means for storing a predetermined correction rule usable for correcting in accordance with the first color separation rule, (f-2) means for setting the first color separation rule in the color image processor, and (f-3) means for correcting the first color separation rule according to the correction rule when the count value is larger than the threshold value to thereby convert the first color separation rule into the second color separation rule in the color image processor.

Since the occupation rate, i.e., the degree to which it is filled, of the memory color in the original color image is used for determining a color separation rule, the process of setting the color separation rule can be attained under objective conditions. Furthermore, when the criterion for judging whether or not each sample pixel has the memory color is determined through a statistical analysis of sample images, the occupation rate can be calculated to a high accuracy.

Accordingly, an object of the present invention is to reduce the burden on an operator in setting a color separation rule in a color image processor.

Another object is to set a color separation rule suitable for reproducing memory colors.

Another object is to shorten the process of setting a color separation rule and to standardize the work for setting a color separation rule.

Another object is to provide an appartus for setting a color sparation rule automatically.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flow chart showing an overall operation of the image processing apparatus according to the preferred embodiment of the present invention;

DESCRIPTION OF THE PREFERRED EMBODIMENTS

A. Structure and Overall Operation

Figure 2:
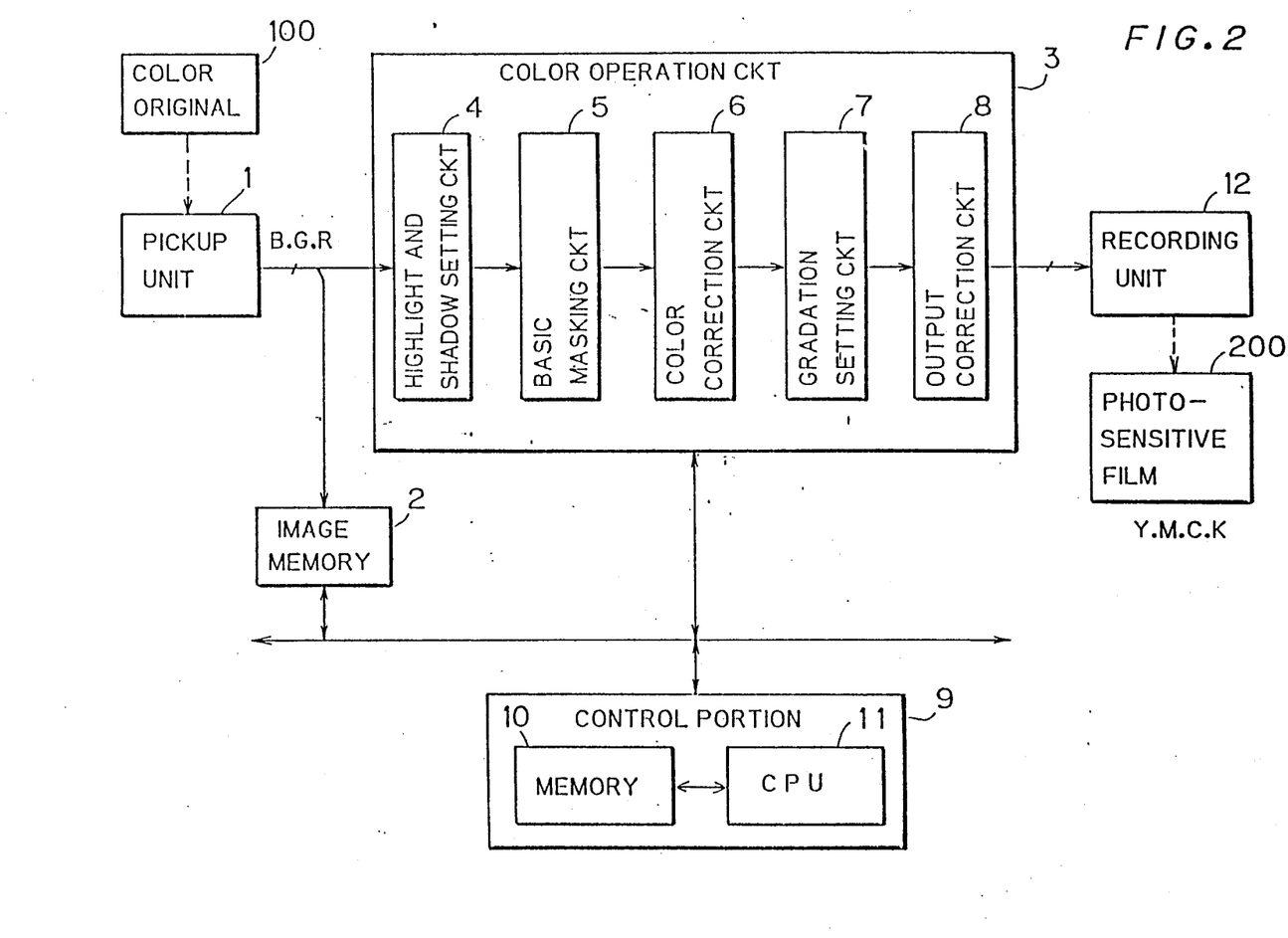
FIG. 2 is a block diagram showing an image processing apparatus according to an preferred embodiment of the present invention.

FIG. 2 is a schematic block diagram showing a color process scanner according to a preferred embodiment of the present invention, and FIG. 3 is a flow chart showing a schematic operation thereof.

This color process scanner comprises a pickup unit 1 for photoelectrically reading an image on a color original 100 for each pixel in the order of scanning lines. The pickup unit 1 has a set of light splitters and color filters for separating light from each of pixels constituting the color original 100 into primary light components of red (R), green (G) and blue (B). The primary light components are converted into electrial signals through photoelectric cells, respectively.

In the step S31 shown in FIG. 3, the color original 100 is first pre-scanned by the pickup unit 1 at high speed, as compared to the scanning speed used for image reproduction, to obtain electrical signals representing color densities of each pixel belonging to a $200 \times 200$ sample pixel array, for example, which is defined on the color original 100. The sample pixel array may consist of sample pixels distributed on the color original 100 at a uniform distribution density, and in this case, the sample pixels can be picked-up while skipping the pixels on the color original 100 at a predetermined skipping ratio. Alternatively, the sample pixel aray may be located at a designated small portion of the color original 100 on which a characteristic part of the original image or a scene including the memory color is found. In addition to control of this sampling, the following various control and arithmetic operations are carried out by a control portion 9. The control portion 9 is constituted by, for example, a microcomputer having a CPU 11 and a memory 10.

Image data of the sample pixels thus obtained, which will be referred to as "a sample image data" hereinafter, are stored in an image memory 2. Since the sample image data comprises data indicating color densities with respect to a relatively small number of sample pixels, the image memory 2 may have a relatively small capacity.

In the next step S32, a density histogram of the color original 100 is generated based on the sample image data in the image memory 2.

In the step S33, standard color separation rules and other parameters for image processing are set in a color operation circuit 3. First, a highlight point, standard shadow point, and gradation curves are determined from the density histogram obtained in the step S32. For this processing, a method can be utilized which is disclosed in, for example, "A Statistical Method for Image Classification and Tone Reproduction Determination", R. Chung, Jr, Appl. Photogr. Sci. Eng., 3, 74, 1974.

The color operation circuit 3 comprises a highlight and shadow setting circuit 4, a basic masking circuit 5, a color correction circuit 6, a gradation setting circuit 7, an output correction circuit 8 and others. The highlight point, the shadow point and the standard gradation curve obtained by the above described processing are set in the highlight and shadow setting circuit 4, the gradation setting circuit 7, respectively. In addition, a standard color correction rule previously determined and stored in the memory 10 is also temporarily set in the color correction circuit 6 in the step S33.

In the step S34, the standard color separation rule set in the step S33 is corrected according to the percentage of memory colors in the image on the color original 100. This processing will be described later in detail.

In the step S35, the color original 100 is scanned by the pickup unit 1 at a normal speed, whereby the image data representing the image on the color original 100 for each pixel is obtained. This reading is performed with respect to all pixels in a desired portion of the color original 100 for image reproduction thereof. The image data for each pixel is delivered to the color operation circuit 3 for each of the colors R, G and B. In the color operation circuit 3, the image data representing the color original 100 is subjected to color arithmetic operation processing according to the corrected color separation rule, the image data being outputted to a recording unit 12.

The recording unit 12 modulates one or more laser beams based on the image data after this color arithmetic operation processing to expose a photosensitive film 300 to the modulated laser beams, whereby latent images for Y, M, C and K colors are obtained on the photosensitive film 200.

B. Principle of Finding Colors Regarded as Memory Colors

Figure 4:
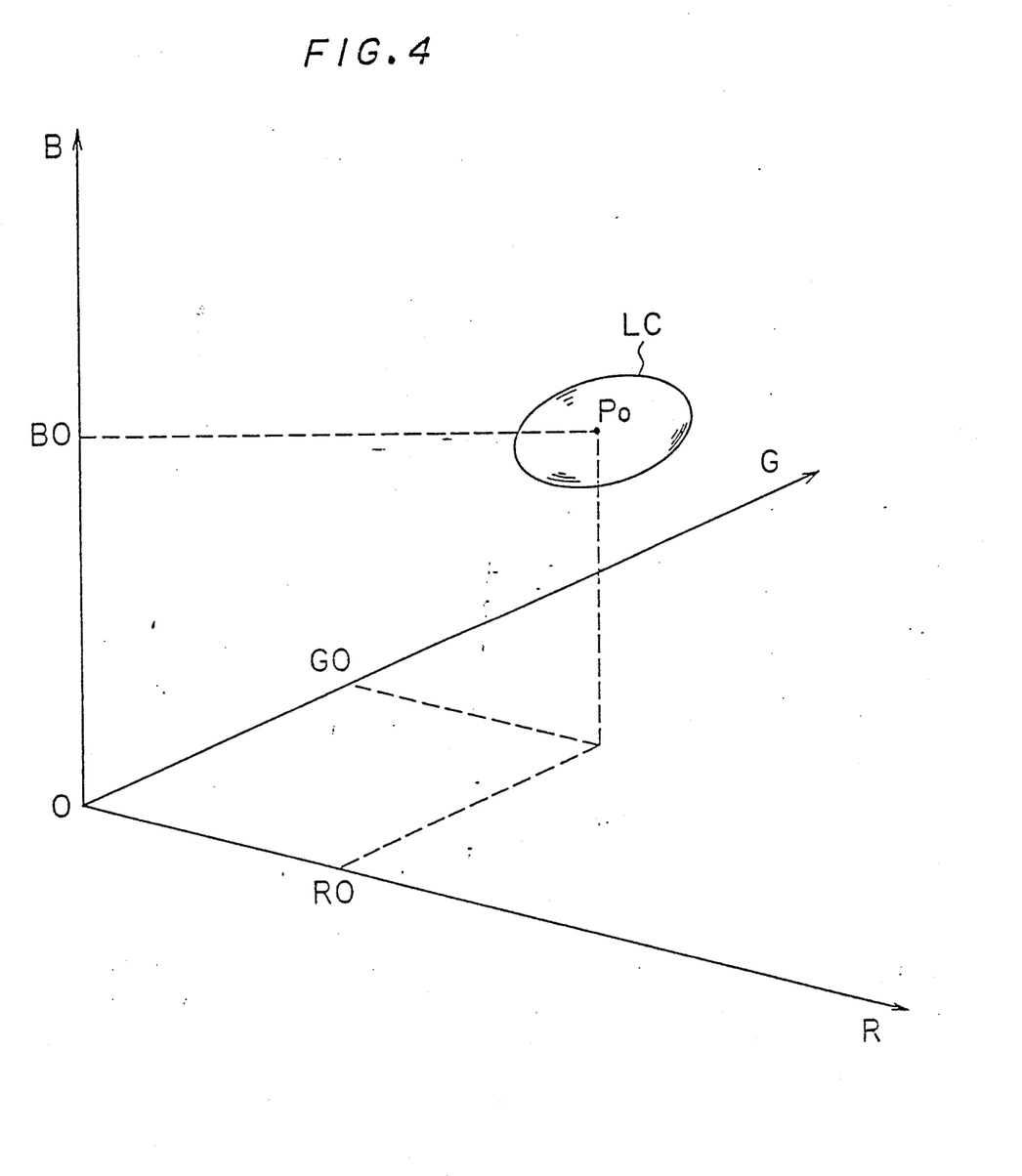
FIG. 4 is a diagram showing a closed space corresponding to a memory color in three-dimensional color coordinates.

This section describes a principle for determining whether or not the color of a sample pixel corresponds to a memory color. FIG. 4 is a diagram showing a closed region LC defined in three-dimensional color coordinates, which is introduced for discriminating memory colors from other colors.

First, a plurality of (preferable, a large number of) sample originals on which images having a designated memory color, e.g., a skin color, are prepared, and the color density on the sample originals are photoelectrically read for each pixel to be separated into components of B, G and R colors. Supposing that M is the total number of the pixels on the sample originals and i is a serial number of the pixels (i.e., $1 \leq i \leq M$), the color components of the i-th pixel can be represented as $B_i$, $G_i$ and $R_i$. The color components $B_i$, $G_i$ and $R_i$ are averaged in the range of $1 \leq i \leq M$, whereby averaged color components BO, GO and RO are obtained. Preferably, originals including the designated memory color at a preferred hue are selected as the sample originals, since the designated memory color in the sample original gives standards in discriminating the memory color from other colors in reproduction of the original 100.

In the three-dimensional color coordinates or color coordinate space, a point $P_O$ having the coordinate values of the averaged components (BO, GO, RO) is defined as shown in FIG. 4. The point $P_O$ is a characteristic or reference point indicating the designated memory color. However, in almost all originals, a memory color included therein does not necessarily coincide with the point $P_O$ and colors corresponding to the memory color are statistically distributed around the point $P_O$. Therefore, in the preferred embodiment, it is determined, on the basis of a predetermined allowable error range, whether or not the color of a sample pixel corresponds to the designated memory color. If the region having this allowable error range in the three-dimensional coordinates is referred to as "memory color region", this memory color region can be represented by the three-dimensional closed region LC including the point $P_O$ in the three-dimensional color coordinates.

This memory color region LC may be determined so as to have an arbitrary shape. However, in view of the situation in which memory colors in an actual color original are statistically distributed, it is desirable to determine the shape, the size and the position of the memory color region in such a form as to reflect the character of distribution.

As is well known, the statistical distribution in most optical parameters has a normal distribution (Gausian distribution). Accordingly, it is assumed that colors corresponding to the designated memory color in the actual color original are distributed according to the normal distribution, and the color components B, G and R of the sample pixels extracted from a set consisting of all pixels in the original are also normally distributed. The equiprobability surface in the distribution is an ellipsoid or the surface of a three-dimensional ellipse centered at the point $P_O$ (BO, GO, RO).

Thus, assuming that a predetermined threshold value as described below is $L^2$, points which exist inside of the closed region or ellipse LC as represented by the following inequality (1) can be statistically considered as the designated memory color:

$$L^2 \geq C_{11}(B - BO)^2 \qquad (1)$$
$$+ C_{22}(G - GO)^2 + C_{33}(R - RO)^2$$
$$+ 2C_{12}(B - BO)(G - GO)$$
$$+ 2C_{23}(G - GO)(R - RO)$$
$$+ 2C_{31}(R - RO)(B - BO)$$

The constants or coefficients $C_{11}$ to $C_{31}$ in the equation (1) represent respective weights of the colors B, G and R characterizing the designated memory color. According to statistics, the coefficient $C_{11}$ to $C_{31}$ can be determined as respective elements in an inverse matrix of a variance-covariance matrix A represented by the following equation (2):

$$A = \begin{pmatrix} V_b & C_{bg} & C_{rb} \\ C_{bg} & V_g & C_{gr} \\ C_{rb} & C_{gr} & V_r \end{pmatrix} \qquad (2)$$

where, $$V_b = \{1/(M-1)\}\Sigma(B_i - BO)^2$$
$$= \{1/(M-1)\}\{\Sigma B_i^2 - (\Sigma B_i)^2/M\}$$
$$V_g = \{1/(M-1)\}\{\Sigma G_i^2 - (\Sigma G_i)^2/M\}$$
$$V_r = \{1/(M-1)\}\{\Sigma R_i^2 - (\Sigma R_i)^2/M\}$$
$$C_{bg} = \{1/(M-1)\} \times \Sigma(B_i - BO)(G_i - GO)$$
$$= \{1/(M-1)\}\{\Sigma B_i G_i - (\Sigma B_i)(\Sigma G_i)/M\}$$
$$C_{gr} = \{1/(M-1)\}\{\Sigma G_i R_i - (\Sigma G_i)(\Sigma R_i)/M\}$$
$$C_{rb} = \{1/(M-1)\}\{\Sigma R_i B_i - (\Sigma R_i)(\Sigma B_i)/M\}$$

$$A^{-1} = \begin{pmatrix} C_{11} & C_{12} & C_{31} \\ C_{12} & C_{22} & C_{23} \\ C_{31} & C_{23} & C_{33} \end{pmatrix} \qquad (3)$$

This mathematical principle is disclosed in, for example, "Multivariate Analysis Method" issued by Nikka Giren Publishing Company, 1981, pp. 261–267.

Following is an example of numerical values taken when the designated memory color is a skin color.

$BO$: 1.198  $GO$: 0.920  $RO$: 0.643
$V_b$: 8.127 × $10^{-2}$  $V_g$: 4.061 × $10^{-2}$
$V_r$: 2.809 × $10^{-2}$  $C_{bg}$: 5.565 × $10^{-2}$
$C_{gr}$: 3.229 × $10^{-2}$  $C_{rb}$: 4.263 × $10^{-2}$

According to this principle, if a sample pixel having the density values ($B_i$, $G_i$, $R_i$) satisfies the equation (1), the color thereof is regarded as a substantially same color with the memory color. If a relatively small value is employed as the threshold value $L^2$ in the inequality (1), the allowable error is decreased and the criteria for then discriminating memory color from other colors become severe, so that only colors resembling closely the designated memory color are regarded as a substantially same color with the designated memory color. Therefore, it is desirable to select the threshold value $L^2$ while considering a balance between rigorousness in detection of the memory color and the allowable error.

According to the preferred embodiment, the threshold value $L^2$ is statistically determined from the standpoint of what percent of colors normally distributed is to be considered as "memory colors". For example, when a risk percentage is set at 3% and there is a probability of 97% at which an arbitrary sample having a color in the vicinity of the memory color satisfies the equation (1), it is assumed that $L^2 = 9.12$ from a table of numerical values representing the $X^2$-distribution with three degrees of freedom, i.e., $X^2(3)$. In general, it is desirable to determine the threshold value $L^2$ such that approximately 95 to 98% of the samples used for finding the average density value ($BO$, $GO$, $RO$) of the designated memory color satisfies equation (1).

Alternatively, the following criteria can be used. First, chromaticities b, g and r are defined from the densities of colors B, G and R through the following equations (4):

$$b = B/(B + G + R)$$
$$g = G/(B + G + R) \quad (4)$$
$$r = R/(B + G + R)$$

The chromaticities b, g and r always satisfy the following condition for normalization:

$$b + g + r = 1 \quad (5)$$

The combination of b, g and r provides a point (b, g, r) on a plane defined by the equation (5) in the three-dimensional b, g and r coordinates.

A memory color region in the two-dimensional space or plane is a two-dimensional region defined by any two of the chromaticities b, g and r. For example, an ellipse on the two-dimensional b and g coordinates may be defined by the following equation (6) to assume that colors of points inside thereof are regarded as the memory color. All the chromaticities b, g and r include a normalization factor (B+G+R) in their denominators, and therefore, the respective magnitudes of the color components B, G and R are taken into consideration by any two chromaticities. Since the probability that the chromaticities b and g of an arbitrary sample pixel satisfy the inequality (6) is expressed by the $X^2$-distribution with two degrees of freedom, a threshold value $l^2$ can be set in the same manner as the threshold value $L^2$ in the above described inequality (1). In addition, a manner for determining averages $b0$ and $g0$ and coefficients $c_{11}$, $c_{22}$ and $c_{12}$ is also similar to that for the inequality (1).

$$l^2 \geq c_{11}(b - b0)^2 + c_{22}(g - g0)^2 \quad (6)$$
$$+ 2c_{12}(b - b0)(g - g0)$$

Data representing the above described inequality (1) or (6) has been previously stored in the memory 10 as the criteria for discriminating memory colors from other colors. When two or more colors are designated as memory colors, the inequality (1) or (6) is prepared and stored for each memory color. Although either of the inequalities (1) and (6) may be employed, the apparatus according to the preferred embodiment employs the inequality (1).

Figure 5:
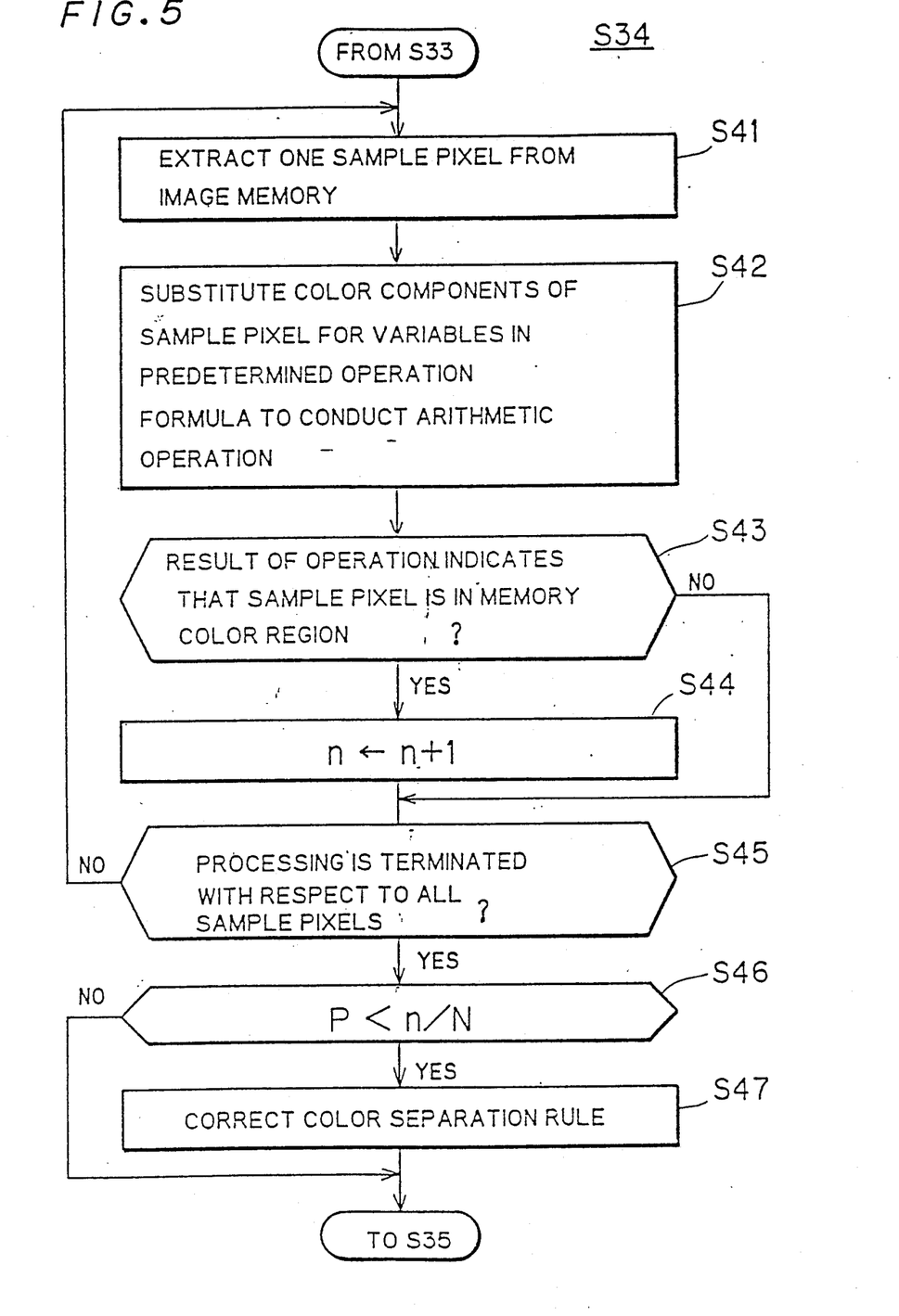
FIG. 5 is a flow chart showing correction of color separation rules for images having memory colors.

C. Actual Process of Finding Occupation Rates of Memory Colors and Correction of Color Separation Rule FIG. 5 is a flow chart showing the processing details for finding occupation rates of memory colors in the original image and correcting the standard color separation rule, which corresponds to the detailes of the step S34 shown in FIG. 3.

First, in the step S41, the sample image data representing the color density of one sample pixel is fetched from the image memory 2. In the step S42, it is determined by performing an arithmetic operation based on the inequality (1) whether or not a point whose coordinate values (B, G, R) are defined by the color components of this sample pixel is located in the internal range of the memory color region or ellipse LC in the three-dimensional color coordinate space. More particularly, the right hand side of the inequality (1) is calculated with respect to the extracted sample pixel, and the calculated value is compared with the threshold value $L^2$.

In the step S43, if it is concluded that the sample pixel is in the memory color region LC, the process proceeds to the step S43, to increment a count value n by "1". This count value n is used for counting the number of sample pixels having colors in the memory color region LC. In the initial stage, the count value has been cleared to "0". If it is decided in step S43 that the sample pixel is outside of the memory color region LC, the count value n remains unchanged. Thus, the count value n will indicate the number of sample pixels in the memory color region LC among all sample pixels, when all sample pixels are subjected to the process.

By the step S45, the foregoing processing is performed with respect to all the sample pixels in the image memory 2. When processing is terminated with respect to all the sample pixels, a value n/N is found which is the ratio of the number n of sample pixels in the memory color range to the number N of all the sample pixels. In other words, the value n/N represents the percentage, i.e., the occupation ratio of the pixels having the memory color in the original image. After the ratio n/N is obtained, the ratio n/N is compared with a predetermined threshold value P, in the step S46.

The threshold value P is a constant which defines a minimum occupation rate of the memory color in the original image above which the standard color separation rule should be corrected for the memory color. This threshold value P is previously found experimentally or is known from prior experience for each memory color because the reproduction quality of memory colors affects the total quality of a print at different degrees for respective memory colors. For example, the quality of the print is substantially affected if the percentage of the green color of the trees and plants in the area of the entire scene is 30% to 50% or more while being affected even if the percentage of the skin color of a human contained therein amounts to only a few percentage points.

If the ratio n/N is larger than the threshold value P, the percentage of the memory color in the color original 100 is estimated to be high, and the standard color separation rule is corrected in the next step S47. The correction includes those of the color correction rules and the gradation curves, and the modified color correction rule and the corrected gradation curves are set in the color correction circuit 6 and the gradation setting circuit 7, respectively. On the other hand, if the ratio n/N is equal to or smaller than the threshold value P, the standard color separation rule is not corrected, the standard color separation rule having been set in the color correction circuit 6 and the gradation setting circuit 7 is used for image reproduction without any modification.

The correction or modification of the color separation rule in the step S47 may be conducted in the following manner according to a predetermined modification rule stored in the memory 10. For example, when the color separation rule is corrected for a skin color, the color of the actual skin of the yellow race such as the Japanese is generally more yellowish than the skin color remembered by humans of other races. Thus, it is preferable to correct the color separation rule so as to somewhat suppress the yellowness in printing. Accordingly, the color correction rules are modified such that the density of a yellow color in reproduction is somewhat suppressed. Consequently, there is obtained a reproduced picture having the yellowness somewhat suppressed, in which the color of a skin-colored portion becomes a more familiar skin color.

Figure 6A:
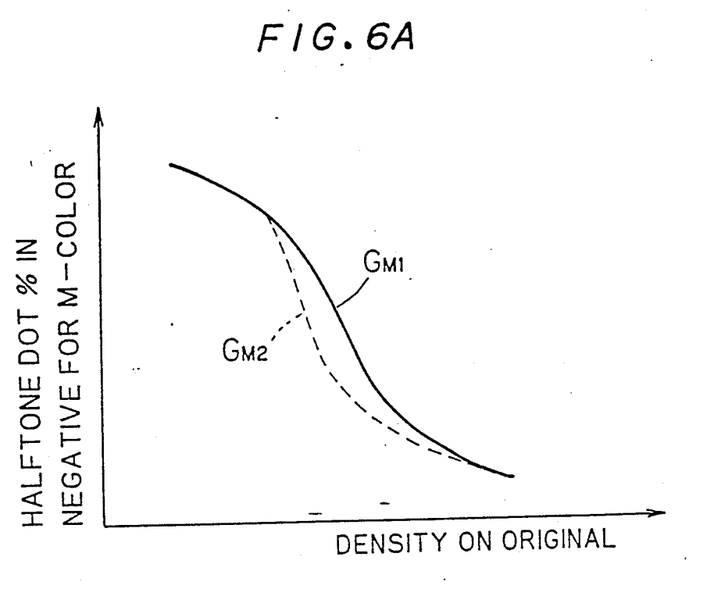
FIG. 6A and 6B are graphs showing examples of correction of gradation curves for images having the memory colors.
Figure 6B:
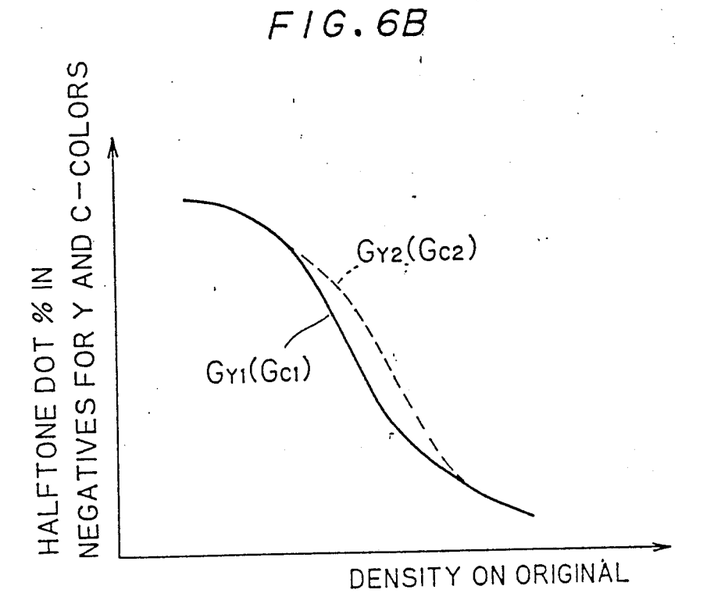

Furthermore, the standard gradation curves are corrected in order to attain gradation correction suitable for the memory color. That is, for the skin color, the halftone dot percentage in an intermediate density portion of a standard gradation curve $G_{M1}$ for an M block of negative reproduction shown in FIG. 6A is decreased to obtain a corrected gradation curve $G_{M2}$. On the other hand, the halftone dot percentages in intermediate density portions of standard gradation curves $G_{Y1}$ and $G_{C1}$ for Y and C blocks of negative reproduction shown in FIG. 6B are increased to obtain corrected gradation curves $G_{Y2}$ and $G_{C2}$. Consequently, the entire image is slightly reddish so that the color of the skin is favorably reproduced. Although it is preferred to modify both the color correction rules and the gradation curves, correction of the gradation curves may be omitted.

Additionally, if there are a plurality of memory colors requiring correction of the color separation rule in the same color original, it is preferred to first determine the priority order in correction of the color separation rule among the plurality of memory colors and to attain the correction for one or more memory colors having high priority or importance. In general, the skin color is the most important. It is followed by the blue color of the sky and the sea the green color of trees and plants. This order of priority may be varied depending on the character of the original image and the use of a print.

Since the color separation rule is corrected and set through the foregoing steps, the designated memory color is reproduced based on the memory of most humans, whereby a favorable print is obtained through the colors thus obtained.

D. Other Embodiments

A plurality of (for example, two or three) threshold values in modification of the standard color separation rule may be prepared with respect to one memory color. In this case, the ratio n/N is compared with the plurality of threshold values $P_1, P_2, \ldots$ and a minimum threshold value is found among the threshold values which is larger than the ratio n/N. Then, the degree of modification of the standard color separation rule is determined or selected in accordance with the found minimum threshold value. Preferably, the degree of modification is increased when the found minimum threshold value is relatively large. Through the selection of the degree of modification or correction, the quality of the reproduced image is further improved.

In addition, although it is desirable to define the closed region such that it will have the statistical allowable error range as a memory color region, the memory color region may be determined based on another criterion. It should be noted that the present invention can be applied to image processing apparatus other than a process scanner.

Figure 7:
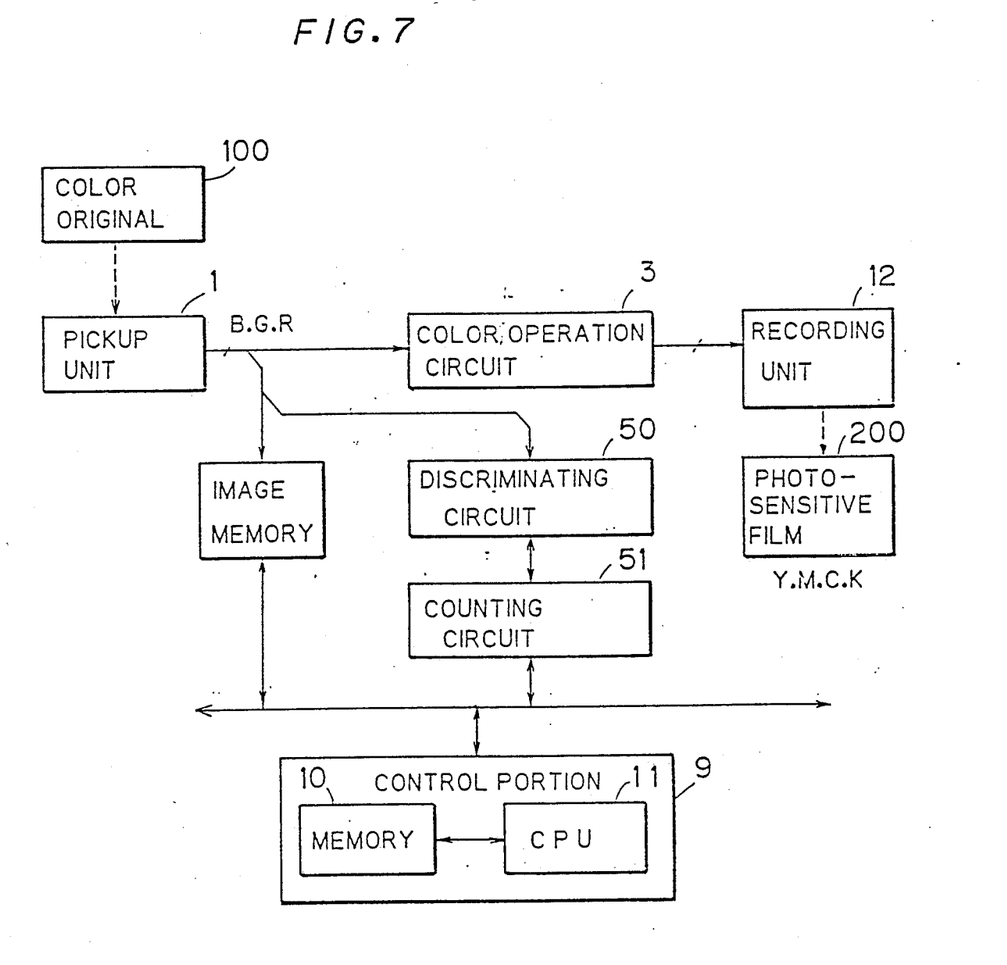
FIG. 7 is a block diagram showing circuits employed in another preferred embodiment of the present invention.

In order to construct a color image processing apparatus according to the present invention, hardware circuits may be employed. FIG. 7 is a block diagram showing a process scanner in which determining whether or not the color of a sample pixel can be regarded as a memory color and counting the number of sample pixels whose colors are regarded as memory colors are each embodied in hardware circuits. In this case, the control portion 9 is now also constituted by hardware circuits, that is, a comparator, a latch circuit and other logic circuit, for example. However, higher flexibility and ease of use can be attained when the control portion 9 is constituted by a memory 10, a CPU 11 and associated components and a software program is used to achieve the object function.

The operation of the process scanner of FIG. 7 is the same as that of the above described color process scanner shown in FIG. 2. Sample image data obtained from a pickup unit 1 during high-speed pre-scanning are sequentially stored in an image memory 2 while being inputted to a discriminating circuit 50 for discriminating a designated memory color from other colors. The number of sample pixels whose colors are judged to be the designated memory color by the designated circuit 50 is counted by a counting circuit 51. After all the sample pixels have been subjected to this processing, a count value of the counting circuit 51 is inputted to the CPU 11 in the control circuit 9, to perform processing similar to that in the above described step S46 and the subsequent steps of FIG. 5. The discriminating circuit 50 may be constituted of a look-up table (LUT) which is supplied with the color components B, G and R and outputs a value "1" only when the color components satisfy the inequality (1). Furthermore, the counting circuit 51 may be constituted by a combination of standard logic circuits such as an 74LS161 IC (SN7400 series) supplied for, from the Texas Instruments Company U.S.A.

Figure 8:
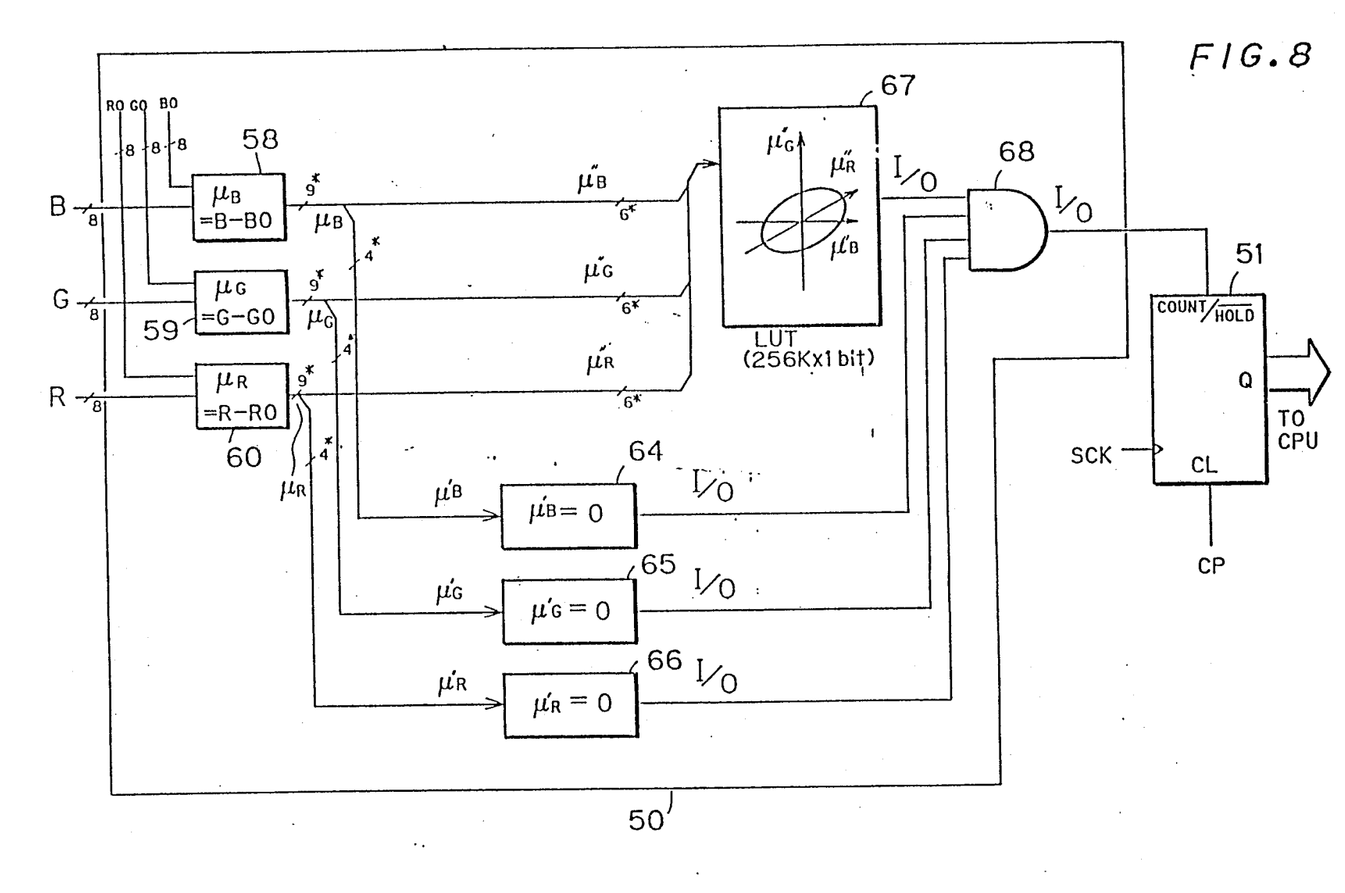
FIG. 8 is a circuit diagram showing an example of the combination of circuits 50 and 51.

FIG. 8 is a circuit diagram showing the structures of the discriminating circuit 50 and the counting circuit 51.

In this example, each of the components of colors B, G and R of the sample image data is inputted to the discriminating circuit 5 in eight bit bytes. Since the color space shown in FIG. 4, is a wide space, a memory having a large capacity ($2^{24} \times 1$ bit, for example) is required when a LUT is constructed such that the inequality (1) for entire space is provided in the LUT. Therefore, in this embodiment, the color space is divided into a region in the vicinity of point $P_0$ shown in FIG. 4 and in the other region. The LUT is prepared only in the region in the vicinity of the point $P_0$ to reduce the required memory capacity of the LUT to practical value, e.g., $256k \times 1$ bits. Subtracters 58 to 60 perform arithmetic operations or subtractions using equations $\mu_B = B - BO$, $\mu_G = G - GO$, and $\mu_R = R - RO$, respectively. Each of the inputs B, G and R and BO, GO and RO has eight bits, while each of outputs $\mu_B$, $\mu_G$ and $\mu_R$ has nine bits because it includes one sign bit. Signals $\mu'_B$, $\mu'_G$ and $\mu'_R$ which are the more significant four bits (one bit thereof being the sign bit) of the 9-bit outputs $\mu_B$, $\mu_G$ and $\mu_R$ are inputted to comparators 64 to 66, respectively. Each of the comparators 64 to 66 is operable to compare the input thereto with a value "0", so that a value or pulse "1" is outputted therefrom when the input is equal to "0" while a value "0" is outputted when the input is not equal to "0". Since the signals $\mu'_B$, $\mu'_G$ and $\mu'_R$ are obtained by extracting the more significant four bits from the signals $\mu_B$, $\mu_G$ and $\mu_R$, the condition $\mu'_B = 0$ ($\mu'_G = 0$, $\mu'_R = 0$) indicates that the absolute value of the signal $\mu_B$ ($\mu_G$, $\mu_R$) is smaller than a value $2^4$, which represents a predetermined distance in the color space. Thus, with respect to points spaced apart from the point $P_0$ by the predetermined value or more, at least one of outputs of the comparators 64 to 66 becomes "0" and an output of an AND circuit 68 becomes "0". When the color of a sample pixel is close to the point $P_0$ which is the reference coordinate point of a designated memory color, the signals $\mu'_B$, $\mu'_G$ and $\mu'_R$ are all "0", so that the outputs of the comparators 64 to 66 are all "1".

On the other hand, six-bits signals $\mu''_B$, $\mu''_G$ and $\mu''_R$ obtained from the eight-bits signals $\mu_B$, $\mu_G$ and $\mu_R$ are inputted to a LUT 67. Each of the inputs $\mu''_B$, $\mu''_G$ and $\mu''_R$ comprises the less significant five bits of the corresponding signal $\mu_B$, $\mu_G$ or $\mu_R$ and a plus or minus sign bit, and can represent values in the range from "$-32$" to "$-31$". The following inequality (1') obtained by substituting $\mu''_B$, $\mu''_G$ and $\mu''_R$ for $(B-BO)$, $(G-GO)$ and $(R-RO)$ in the inequality (1) is expressed in a table form to be stored in the LUT 67:

$$L^2 \geqq C_{11}\mu''^2_B + C_{22}\mu''^2_G + C_{33}\mu''^2_R \quad (1')$$
$$+ 2C_{12}\mu''_B\mu''_G + 2C_{23}\mu''_G\mu''_R + 2C_{31}\mu''_R\mu''_B$$

When the values $\mu''_B$, $\mu''_G$ and $\mu''_R$ which are respective parts of sample pixel data satisfy the inequality (1'), an output of the LUT 67 becomes "1". More particularly, the LUT 67 is constructed such that a value "1" is outputted therefrom only when the value obtained by subtracting $L^2$ from the right-hand side of the inequality (1') is zero or a negative value, or equivalently, only when the value obtained by subtracting the right-hand side from the value $L^2$ is a positive value. Then, when the output of the LUT 67 is "1" under the condition where the outputs of the comparators 64 to 66 and the LUT 67 are all "1", the output of the AND circuit 68 is "1" so that the count value of the counting circuit 51 is incremented by "1".

Meanwhile, the counting circuit 51 is supplied with a clear pulse CP to clear it before the pickup unit 1 is enabled for the pre-scan. In addition, sampling clock pulses SCK for specifying the sampling pixels are inputted to a sampling clock terminal of the counting circuit 51.

In this example, if the densities of the colors B, G and R of each of the sample pixels represent values in the density range 0 to 4.0, the least significant bit represents a density of approximately 0.016 obtained by dividing 4.0 by $2^8$. Thus, the data range of the LUT 67 in which each of the inputs $\mu''_B$, $\mu''_G$ and $\mu''_R$ is acceptable by the LUT 67 is approximately $\pm 0.5$ in density. Thus, the memory color region can be defined on the LUT 67 with a required range and a resolution sufficient for discriminating the memory color from other colors at high accuracy.

The hardware circuits having the structures shown in FIGS. 7 and 8 can respectively determine whether or not the color of each of the sample pixels is included in the memory color region and count the number of sample pixels whose colors are included in the memory color region during high-speed pre-scanning, so that the color separation rule can be corrected immediately after the high-speed pre-scanning.

Although the preferred embodiments have been described in the case where the standard color separation rule has been previously set in the process scanner to be corrected through the predetermined correction rule or modification rule when the percentage of the memory colors in the original is equal or higher than a predetermined percentage, two or more standard color separation rules which are different from each other may be prepared so that one of them is selected to be used in accordance with the percentage of the memory colors.

Furthermore, correction of the color separation rule may be conducted while taking variation of memory colors into consideration. For example, when the skin color is a flesh color of a white or black race person (e.g., brown or the like, rather than of a person of the yellow race), the correction rule is modified according to the character of the designated flesh color. If it is desired to reproduce sky-blue which is more faithful to the human's memory than sea-blue, the point $P_0$ may be set so as to represent a typical sky-blue so that the correction of the standard color separation rule is conducted mainly for sky-blue among various blue colors, e.g., sky-blue, sea-blue, cyan-blue and others.

According to the present invention, since a predetermined color separation is corrected or selected if the percentage of an area having memory colors in a color original is equal to or greater than a threshold value. Accordingly, an objective criterion for determining whether the correction of the color separation rule is required or not is provided, so that the burden on an operator is reduced, the process is shortened, the work is standardized, and a reproduced image whose finish does not vary even if the operator has no considerable experience is obtained. Therefore, this method is suitable for automation.

Additionally, the present invention provides an apparatus in which setting of a color separation rule is automated and an allowable error in descrimination of memory colors can be statistically determined.

Although the present invention has been described and illustrated in detail, it is to be clearly understood that the same is by way of illustrtion and example only and is not to be taken by way of limitation, the spirit and scope of the present invention being limited only by the terms of the appended claims.

I claim:

1. A method of setting a color separation rule in a color image processor, said color separation rule being used to separate a color image data into color components suitable for reproducing a color image represented by said color image data, said method comprising the steps of:
    (a) designating a memory color,
    (b) determining a criterion for judging whether a given color represented by a set of color components matches said memory color within a predetermined allowable error range,
    (c) designating sample pixels among pixels of a color original image prepared for image reproduction,
    (d) detecting respective color components for each sample pixel,
    (e) applying said criterion to said color components for each sample pixel to detect the number of sample pixels whose respective colors match said memory color within said allowable error range,
    (f) finding a ratio of said number of sample pixels whose respective colors match said memory color to the total number of said sample pixels, and
    (g) determining a first color separation rule in accordance with said ratio to set said first color separation rule in a color image processor which is used for separating said original image into color components in order to reproduce said color original image for each color component.

2. The method of claim 1, wherein the step (b) includes the step of:
    (b-1) defining a closed region in a color coordinate space so that a point representing said memory color in said color coordinate space is located in said closed region, said criterion being such that said given color is regarded as said memory color if a point representing said given color in said color coordinate space is located in said closed region.

3. The method of claim 2, wherein the step (b) further includes the steps of:
    (b-2) detecting respective color components of a plurality of sample images for each pixel, wherein each of said plurality of sample images has said memory color, and
    (b-3) statistically analyzing said color components of said plurality of sample images to find parameter values representing a color distribution around said memory color in said plurality of sample images, and wherein the step (b-1) includes the step of:
    (b-11) determining a shape and a size of said closed region in accordance with said parameter values.

4. The method of claim 3, wherein the step (b-3) includes the steps of:
    (b-31) obtaining a variance-covariance matrix representing said color distribution, and
    (b-32) obtaining respective matrix components of an inverse matrix of said variance-covariance matrix, and
    the step (b-1) includes the steps of:
    (b-12) defining an ellipse as said closed region in said color coordinate space such that a shape and a size of said ellipse are determined in accordance with said matrix elements and said allowable error range, respectively, and a center of said ellipse is located at said point representing said memory color.

5. The method of claim 4, wherein
    said color coordinate space is a three-dimensional space having three variables corresponding to three primary colors, and
    said ellipse is a three-dimensional ellipse having said three variables.

6. The method of claim 4, wherein
    said color coordinate space is a three-dimensional space having the variables corresponding to three primary colors, and
    said ellipse is a two-dimensional ellipse having two variables which are obtained by dividing two of said three variables by the sum of said three variables, respectively.

7. The method of claim 1, wherein the step (g) includes the steps of:
    (g-1) preparing a second color separation rule,
    (g-2) comparing said ratio with a predetermined threshold value, and
    (g-3) correcting said second color separation rule according to a predetermined correction rule when said ratio is larger than said threshold value, to thereby obtain said first color separation rule.

8. The method of claim 1, wherein the step (g) includes the steps of:
    (g-1) preparing a plurality of second color separation rules,
    (g-2) comparing said ratio with a predetemined threshold value, and
    (g-3) selecting one of said plurality of second color separation rules in accordance with a result of the comparison in the step (g-2) to define said first color separation rule by a selected one of said plurality of second color separation rules.

9. The method of claim 1, wherein the step (a) includes the steps of:
    (a-1) designating a plurality of memory colors,
    (a-2) determining a priority order for said plurality of memory colors, and
    (a-3) selecting one of said plurality of said memory colors according to said priority order to thereby designate said memory color.

10. The method of claim 1, wherein the step (c) includes the step of:
    (c-1) designating said sample pixels so that said sample pixels are uniformly distributed on said color original image.

11. The method of claim 1, wherein the step (c) includes the step of:
    (c-1) designating a part of said color original image, said sample pixels being arrayed on said part of said color original image.

12. An apparatus for setting a color separation rule in a color image processor, said color separation rule being used to separate color image data into color components suitable for reproducing a color image represented by said color image data, said apparatus comprising:
    (a) first memory means for storing information representing a closed region which is defined in a color coordinate space such that a center point of said closed region is located at a point representing a designated memory color in said color coordinate space, the size of said closed region being determined in accordance with an allowable error range in detection of said memory color, said allowable error range being obtained by statistically analyzing a plurality of sample images having said memory color, (b) sampling means for extracting sample pixels from a color original image and for detecting respective color components for each sample pixel, (c) means for judging whether a point having coordinate values represented by said color components of each sample pixel is located in said closed region, (d) counter means for counting the number of sample pixels having colors located in said closed region and for generating a count value proportional to said number, (e) comparator means for comparing said count value with a predetermined threshold value, and (f) selecting means for selectively setting one of first and second color separation rules in said color image processor in accordance with the result of the comparison effected in said comparator means, said first and second color separation rules being different from each other.

13. The apparatus of claim 12, wherein said selecting means includes:
    (f-1) second memory means for storing a predetermined correction rule usable for correcting said first color separation rule,
    (f-2) means for setting said first color separation rule in said color image processor, and
    (f-3) means for correcting said first color separation rule according to said correction rule when said count value is larger than said threshold value to thereby convert said first color separation rule into said second color separation rule in said color image processor.

14. The apparatus of claim 12, wherein said selecting means includes:
    (f-1) second memory means for storing said first and second color separation rules, and
    (f-2) means for selecting one of said first and second color separation rules in accordance with the result of the comparison effected in said comparator means to set a selected color separation rule in said color image processor.

15. The apparatus of claim 12, wherein said judging means includes:
    (c-1) means for calculating respective differences between said color components of each sample pixel and coordinate values of said memory color, where each of said respective differences is represented by a combination N-bit digital data and a sign bit, N being an integer larger than one,
    (c-2) means for separating said N-bit digital data into more significant $N_1$-bits and less significant $N_2$-bits, where the numbers $N_1$ and $N_2$ are positive integers satisfying $N_1 + N_2 = N$
    (c-3) means for judging whether an object point having coordinate values defined by a combination of said less significant $N_2$-bits and said sign bit corresponding to respective color components of each sample pixel is located in said closed region,
    (c-3) means for comparing said more significant $N_1$-bits with zeros, and
    (c-4) means for generating a detection signal when said object point is located in said closed region and said more significant $N_1$-bits are zeros, and
said counter means includes:
    (d-1) means for counting said detection signal and thus the number of sample pixels whose colors are located in said closed region.

16. The apparatus of claim 12, wherein said sampling means includes:
    (b-1) means for photoelectrically reading said color original image while skipping pixels on said color original image at a predetermined skipping ratio to detect said respective color components for each sample pixel.

17. The apparatus of claim 16, wherein said photoelectrical reading means includes:
    (b-11) means for scanning said color original image at a scanning speed faster than a scanning speed at which said color original image is scanned for image reproduction in order to detect said respective color components of said sample pixels.

18. The apparatus of claim 12, wherein said sampling means includes:
    (b-1) means for scanning a designated portion of said color original image in order to detect said respective color components of said sample pixels.

* * * * *